United States Patent [19]
Krueger et al.

[11] Patent Number: 5,331,646
[45] Date of Patent: Jul. 19, 1994

[54] ERROR CORRECTING CODE TECHNIQUE FOR IMPROVING RELIABLILITY OF A DISK ARRAY

[75] Inventors: Mark S. Krueger, Cypress; E. David Neufeld, Tomball, both of Tex.

[73] Assignee: Compaq Computer Corporation, Houston, Tex.

[21] Appl. No.: 880,724

[22] Filed: May 8, 1992

[51] Int. Cl.$^5$ .................... G06F 11/10; G06F 11/20; G11B 20/18

[52] U.S. Cl. .................... 371/40.1; 371/10.1; 371/40.4

[58] Field of Search .................... 371/40.4, 40.1, 51.1, 371/10.1, 10.2; 395/575

[56] References Cited

U.S. PATENT DOCUMENTS

| | | | |
|---|---|---|---|
| 4,958,351 | 9/1990 | Flora et al. | 371/40.1 |
| 5,134,619 | 7/1992 | Henson et al. | 371/40.1 |
| 5,148,432 | 9/1992 | Gordon et al. | 371/10.1 |
| 5,265,098 | 11/1993 | Mattson et al. | 371/11.1 |
| 5,265,104 | 11/1993 | Weng | 371/40.1 |
| 5,271,012 | 12/1993 | Blaum et al. | 371/10.1 |

OTHER PUBLICATIONS

Patterson, D. A., Gibson, G., Katz, R. H.; "A Case for Redundant Arrays of Inexpensive Disks (Raid)"; Dec., 1987; pp. 1-24.
Schulze, M. E.; "Considerations in the Design of a Raid Prototype"; Aug., 1988; pp. 1-35.
Gibson, G., Hellerstein, L., Karp, R. M., Katz, R. H., Patterson, D. A.; "Coding Techniques for Handling Failures in Large Disk Arrays"; Dec., 1988; pp. 1-29.
Patterson, D. A., Chen, P., Gibson, G., Katz, R. H.; "Introduction to Redundant Arrays of Inexpensive Disks (Raid)"; 1989; pp. 112-117.
Ng, S.; "Some Design Issues of Disk Arrays"; 1989, pp. 137-142.
Anderson, D. B., Garrettson, G. A.; "Disk Array Considerations"; Date Unknown; pp. 1-10.

*Primary Examiner*—Stephen M. Baker
*Attorney, Agent, or Firm*—Pravel, Hewitt, Kimball & Krieger

[57] ABSTRACT

An array of disk drives organized as a data storage system including n parity drives forming n parity chains where each parity drive maintains the parity bits of a different combination of data drives and each data drive is included in at least two parity chains, and where no two data drives are associated with the same combination of parity chains. The present ECC technique requires only n parity drives for up to $2^n - n - 1$ data drives for a maximum total of $2^n - 1$ disk drives. Each data drive is included in two or more parity chains and each parity chain is unique. The n parity drives are taken two at a time, then three at a time, and so on up to n at a time, each combination being unique, until all of the data drives are associated with parity chains. The ECC technique is implemented using a disk controller which is coupled to the array of disk drives and constantly maintains the parity information on the parity drives. The disk controller selects appropriate parity chains to reconstruct the data of any two data drives that fail, and also performs the reconstruction onto replacement disk drives. Data striping or distribution of the data and parity information on the disk drives further increases the performance of a disk array using the present ECC technique.

13 Claims, 2 Drawing Sheets

ERROR CORRECTING CODE TECHNIQUE FOR IMPROVING RELIABLILITY OF A DISK ARRAY

BACKGROUND OF THE INVENTION

1. Field of the Invention

The present invention relates to a technique for improving the reliability of a data storage system using an array of disk drive units.

2. Description of the Related Art

The performance of the microprocessor or central processing unit (CPU) of a computer system has increased dramatically due to the expanding personal computer and small work station computer markets. The internal electronic memory of a computer system, implemented by dynamic and static random access memories (RAMs), has basically kept pace with the advancing CPU technology so that the computer system's internal memory is faster and more reliable. In contrast to the dramatic improvements of the processing portions of a computer system, the mass data storage portion of a computer system has experienced only modest growth in speed and reliability. This trend is undesirable since although data can be processed at unprecedented rates, the overall system may fail to fully capitalize on the increased speed since the entire system is slowed down by the mass data storage devices.

The speed of magnetic disk drives has not improved much in recent years. However, the size of disk drives are becoming smaller while maintaining the same or even greater storage capacity. Large computer systems have traditionally used one or two large and expensive magnetic disk drives due to their higher storage capacity, higher performance and previously lower cost per byte compared to smaller, less expensive disk drives. Due to improvements in small and inexpensive disk drives, however, data storage costs for smaller drives is competitive with larger drives and smaller drives offer better efficiency in terms of volume. The problem with smaller drives, however, is that they do not have the capacity that many systems require, and a plurality of standalone small disk drives significantly decreases the overall reliability of the data storage system.

It has been recognized that an alternative to single large expensive data drives to achieve a high capacity data storage system can be realized by organizing multiple small disk drives into an array of drives. However, large numbers of the smaller disk drives dramatically increases the chance of any disk failure which, in turn, increases the risk of data loss. This problem has been addressed by including redundancy in the disk arrays so that the data lost on any failed disk drive can be reconstructed through the redundant information stored on the surrounding disk drives. Five different levels of redundant arrays of inexpensive disks (RAID) are introduced and analyzed by D. Patterson, G. Gibson, and R. Katz, "A Case for Redundant Arrays of Inexpensive Disks (RAID)", December, 1987 (hereinafter Patterson).

The first level RAID introduced in Patterson is mirrored drives, which will be discussed further below. The second level of RAID introduced an error code correction (ECC) scheme using the Hamming code where additional check disks are provided to detect single errors, identify the failed disk and correct the disk with the error. ECC techniques have been used in memory systems for some time where extra semiconductor chips are included to correct single errors and to detect double errors in a group. The second level RAID applied these ECC methods in an analogous manner to disk arrays. The third level RAID recognizes that disk drives can detect their own errors, thus eliminating many check disks of level two RAID. The fourth level RAID provides for independent reads and writes which allows parallel input-output (I/O) operations, and the fifth level RAID provides striping where data and parity information are distributed throughout the disk drives in the array. The first and fifth level RAIDS are discussed further and contrasted in D. Patterson, P. Chan, G. Gibson and R. Katz, "Introduction to Redundant Arrays of Inexpensive Disks (RAID)" 1989.

The implementation of data redundancy such as in the RAID schemes discussed above, allows for fault tolerant systems wherein if one drive fails in a given system, the system may still operate without data loss. This is contrasted to a disk array of drives in a nonfault tolerant system wherein the entire system is considered to have failed if any one of the drives fail. If one drive fails in a fault tolerant system, the drive is replaced and the data is retrieved from surrounding disks containing the redundant information. The entire replacement process may occur within a statistically calculable amount of time referred to as the mean time to repair (MTTR). A typical MTTR for the average small drive is approximately 48 hours assuming an operator is required to physically replace the drive, although this time may be significantly lowered using stand-by or hot spares which are electrically connected and require no operator assistance.

Several known disk array structures, such as the first through fourth level RAIDS of Patterson, are organized into a plurality of fault-tolerant groups wherein each group provides enough redundancy to reconstruct a single disk drive failure within that group. The entire system will fail only if any one of the groups fails. If the array is organized into groups which allow only one failure per group, two drive failures within a given group brings down the group and the system, although one failure in each group will not cause such a failure of the system. A disk array organized into single-failure tolerant groups can tolerate multiple disk drive failures as long as there is only one drive failure per group. Assuming enough additional replacement disk drives are available, multiple disk drive failures may occur without significantly effecting the MTTR since the drives are all replaced in parallel or at the same time.

For example, the first level RAID which is referred to as mirrored disks, provides a mirrored or duplicate disk for each data disk. A system with three data drives and three mirror drives would have three groups, each group consisting of a data drive and its mirror drive. If either the data drive or its mirror drive fails in one or more groups, data loss will not occur since the data is duplicated on the other drive. Obviously, however, if both data and mirror drive fails in any one group, data loss results. This option is relatively expensive since there is only 50% utilization of the disks in a disk array and the overhead cost is 100%, although it does provide a relatively reliable system.

The third and fourth level RAID simply provide a single check or parity disk for each group in the disk array to provide the redundant information so that detected errors can be corrected. This technique utilizes the fact that practically all disk drives today can detect their own errors since they incorporate ECC schemes on each sector within the disk. Further, a disk controller, which is used to coordinate and control data flow to the data disks, can detect which data drive has failed since it will not get a response from the failed disk. The disk controller calculates and maintains the parity of each group of data drives on a byte by byte basis. Each parity byte is determined by taking the "EXCLUSIVE OR" logic function of all of the corresponding bytes of every data drive in a group and storing it in the parity drive. When a data disk fails, the disk controller first determines which drive failed and then the data is reconstructed onto a replacement data disk. The information of the failed disk is reconstructed by taking the EXCLUSIVE OR of all corresponding bytes of the remaining good disks and the parity disk, the result being equal to the lost data. If the parity disk fails, it is simply replaced and the parity is recalculated and stored onto the replacement disk.

The third and fourth level RAID reduce the check disks to one parity disk per group, which reduces the overhead cost and the group size compared to the second level RAID. In general, the performance per disk increases since there are fewer parity disks, although there are practical limits to the number of data disks to parity disks.

There may only be one drive failure per group without causing data loss or down time in the disk arrays discussed above. Therefore, until the failed drive is replaced the entire system is very vulnerable to data loss. Any second drive failure in any given group during a first drive failure will cause loss of data. Even when hot spares are used, which allows drives to be replaced without operator intervention, thereby reducing the MTTR, there still remains a significant MTTR period because the data must be reconstructed to the replacement drive.

The reliability of data storage systems implemented using disk arrays can be improved even further by allowing a second drive failure to occur without data loss. Several schemes using ECC methods which allow double disk failures in a disk array have been disclosed. See G. Gibson, L. Hellerstein, R. Karp, R. Katz and D. Patterson, "Coding Techniques for Handling Failures in Large Disk Arrays", December, 1988, (hereinafter Gibson). In general, double-failure tolerant systems typically use parity drives and organize the disk array so that each data drive is associated with at least two groups, one parity drive per group. Thus, alternate groups can be selected in the event of a second drive failure within a first group being used to reconstruct the data of a first drive failure. The schemes of interest in Gibson are the 2d-parity, the full-2 code and the full-3 code.

A disk array implemented using the 2d-parity code includes a set of $G^2$ data drives arranged in a two dimensional array, where G is the number of data drives in each row and each column. For each row and for each column of the array, a parity drive is provided where the parity for that row or column is stored. Thus, each data drive belongs to two groups and if a data drive fails, its data can be reconstructed from either group. This technique is aimed at minimizing the update penalty, or the number of parity drives that need to be updated each time data is written to a data drive. The update penalty is two since each data drive is involved with two groups, otherwise referred to as parity chains. Note also that the number of data drives per parity drives is $G^2/2G = G/2$. This technique may be generalized to nd-parity code, but this quickly becomes impractical as n becomes greater than three since the number of parity drives becomes excessive.

A disk array implemented using the full-2 code again includes each data disk in two parity chains, except that the full-2 code uses less parity drives. Each data drive is associated with exactly two parity chains and no two parity chains include the same combination of data drives. The maximum number of data drives that can be used for a given number of parity drives is equal to the number of parity drives taken two parity drives at a time. For example, for six parity drives, a maximum of fifteen data disks may be used to implement the full-2 code technique. The full-2 code has the same update penalty as the 2d-parity code, or an update penalty of two, while the full-2 code uses less parity drives. The full-3 code is similar to the full-2 code, except that each data drive is associated with exactly three parity chains instead of two, and it has an update penalty of three.

The 2d-parity and full-2 codes were attractive since they allowed any two drive failures, and in some cases more than two drive failures, to occur without loss of data. These two methods are aimed at reducing the update penalty so that each time data is written to a data disk, only two parity drives need be updated. These two techniques are limited, however, since the number of data drives that can be used for a given number of parity drives is low, so that drive utilization, or the number of data drives divided by the total number of disk drives, is relatively low. The full-3 code increases drive utilization compared to full-2 code somewhat, but drive utilization is still not maximized. It is desirable to have a disk array which allows at least two drive failures to occur without data loss and to maximize the drive utilization at the same time.

SUMMARY OF THE PRESENT INVENTION

The ECC technique of the present invention improves the efficiency and reliability of a disk array data storage system by allowing any second disk drive to fail during the MTTR period after a first disk drive has failed, without suffering any data loss, and with fewer parity drives than previously known methods. The reason for the improved reliability is that the probability of a third drive failure during the relatively short MTTR period is low. Since the probability of data loss is equal to the probability of a third drive failure during the MTTR time period, the ECC technique of the present invention is extremely reliable. The efficiency of the present technique is improved over prior art systems since fewer parity drives are required for a given number of data drives.

A system using the present invention is even more reliable than a mirrored drive system yet requires fewer drives. The ECC technique of the present invention is similar in some respects to the ECC methods previously known in that parity drives are included to maintain parity information and a disk controller is used to determine which drive has failed. A system using the present ECC technique, however, requires only n parity drives for $2^n - n - 1$ data drives for a total of $2n - 1$ drives, where n is derived from the number of data drives needed for a given computer system.

In general, the ECC technique of the present invention uses n parity drives to create n parity chains, where each parity drive maintains the parity bytes of a different combination of data drives. Each data drive must be included in at least two parity chains and no two data drives can be associated with the same exact set of parity chains. Further, the present technique allows for the use of fewer parity drives than the 2d-parity and full-2 coding schemes by associating some of the data drives with more than two parity chains. In fact, the parity drives are taken two at a time, then three at a time and so on up to n at a time until all of the data drives are associated with parity chains.

The application of the ECC technique of the present invention is summarized as follows. The disk controller senses which data drive has failed and then determines each parity chain that the failed drive is associated with. The disk controller then chooses one of the parity chains to reconstruct the data onto a replacement drive used to replace the failed data drive. A single failed data drive is easily reconstructed using the parity drive and the remaining data drives in the associated parity chain. The lost data is determined, byte by byte, by taking the EXCLUSIVE OR of all of the remaining data drives and the parity drive in the associated parity chain, the result being the lost data.

If a second disk drive fails while the first drive is being replaced, the disk controller first determines whether the second drive is part of the parity chain being used to reconstruct the first failed drive. If not, then the reconstruction of the first failed drive can continue without interruption, and the second drive is reconstructed either concurrently or consecutively onto a second replacement drive in a similar manner.

If, however, the second failed drive was being used to reconstruct the first failed drive, the disk controller determines if an alternate parity chain is available to reconstruct the first failed drive that does not include the second failed drive in the alternate parity chain. If an alternate parity chain is available, the first failed drive is reconstructed using the alternate parity chain, and the second failed drive is replaced as described above. If there are no alternate parity chains that do not involve the second failed disk drive, then the disk controller identifies a parity chain to reconstruct the second failed drive that does not involve the first failed drive. After the second failed drive is reconstructed, the first failed drive can be reconstructed. The ECC technique of the present invention assures that one of the two failed drives can be reconstructed using a parity chain that does not involve the other. Thus, one of the two failed drives can always be replaced without using the other, so that the system can tolerate two disk drive failures at one time without any data loss.

The present ECC technique can be improved further if the parity and data information is distributed throughout the disk array, so that each disk drive contains data and parity information. This method is referred to as striping which allows partial stripe writes to occur simultaneously.

The ECC technique of the present invention, therefore, greatly improves the reliability of a disk array without adding an excess number of parity disks. In fact, the present invention is more reliable than data storage systems using mirrored drives yet uses less parity disks than systems using the 2d-parity, the full-2, or the full-3 code methods.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE INVENTION

Figure 1:
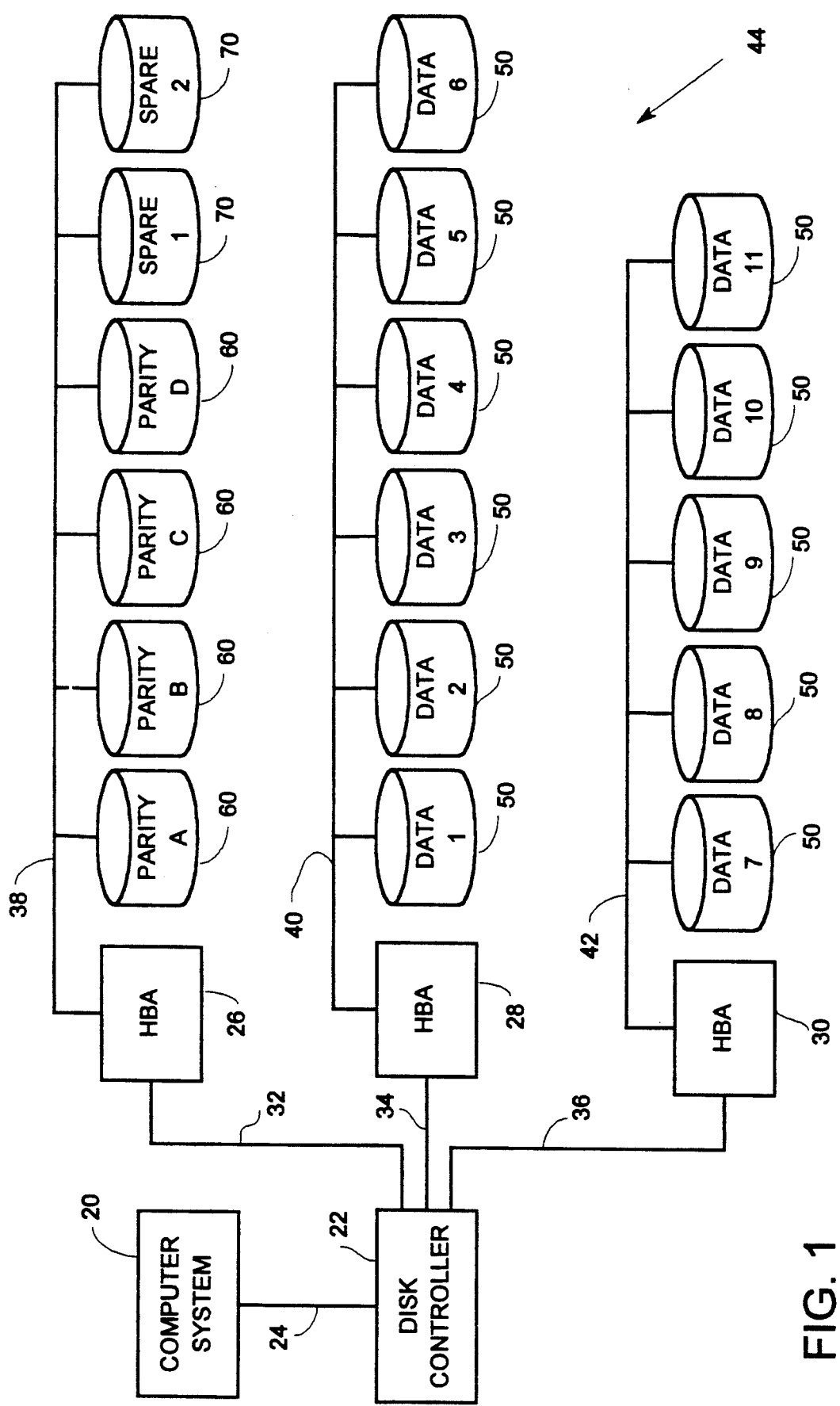
FIG. 1 is a simplified block diagram illustrating a computer system coupled to a disk array implementing the ECC technique of the present invention.

To implement the ECC technique of the present invention, it is first necessary to determine the amount of data storage required, or the number of data drives needed for a given system. It is not easy to directly calculate the number of parity drives needed from the number of data drives. The number of parity drives is easy to determine, however, in a backwards manner from the following equation 1:

$$X = 2^n - n - 1 \tag{1}$$

where n equals the number of parity drives, and X equals the maximum number of data drives that can be used with n parity drives to implement the ECC technique of the present invention. It is even easier to refer to Table I, below, which shows the maximum number of data drives for values of n ranging from three to ten.

TABLE I

| Number of Parity Drives | Comparison of Maximum Number of Data Drives for a Given Number of Parity drives of Various Techniques | | | |
|---|---|---|---|---|
| | Maximum Number of Data Drives | | | |
| | Present Technique | 2d-parity | Full-2 | Full-3 |
| 3 | 4 | — | 3 | 1 |
| 4 | 11 | 4 | 6 | 4 |
| 5 | 26 | — | 10 | 10 |
| 6 | 57 | 9 | 15 | 20 |
| 7 | 120 | — | 21 | 35 |
| 8 | 247 | 16 | 28 | 56 |
| 9 | 502 | — | 36 | 84 |
| 10 | 1013 | 25 | 45 | 120 |

Table I also illustrates a comparison of the maximum number of data drives that can be used for a given number of parity drives for the present technique, the 2d-parity code, the full-2 code, and the full-3 code. The maximum number of data drives for n parity drives for the 2d-parity code is determined from equation 2:

$$X = \left(\frac{n}{2}\right)^2 \tag{2}$$

The maximum number of data drives for the full-2 code is the number of combinations of the parity drives taken two at a time as shown by equation 3:

$$X = \binom{n}{2} = \frac{n(n+1)}{2} - n \tag{3}$$

The full-3 code is similar to the full-2 code, except that the parity drives are taken three at a time as shown by equation 4:

$$X = \binom{n}{3} \tag{4}$$

The maximum number of data drives for the ECC technique of the present invention is determined by taking the parity drives two at a time, then three at a time, and so on up to n at a time, as shown by equation 5:

$$X = \binom{n}{2} + \binom{n}{3} + \ldots + \binom{n}{n} = 2^n - n - 1 \tag{5}$$

Note that a disk array using the present invention having n parity drives and $2^n - n - 1$ data drives has a total of $2n-1$ disk drives. The number n should be greater than two since if n equals two there would be two parity drives for one data drive, which is not a practical system. Furthermore, less than $2^n - n - 1$ data drives may be used for n parity drives, but since the parity drives are first taken two at a time, at least $n(n+1)/2 - n + 1$ data drives should be used for n parity drives for a total of $n(n+1)/2 + 1$ disk drives since otherwise the data storage system would be equivalent to a system using the full-2 code. If less than $n(n+1)/2 - n + 1$ data drives are required, it may be possible to use less than n parity drives to implement the ECC technique of the present invention so that n changes and the drive ratio also changes.

Table I is used to determine the number of parity drives needed for a given number of data drives, or to determine the maximum number of data drives for a given number of parity drives. For example, if six parity drives are used, the present ECC technique could handle up to 57 data drives whereas the 2d-parity could handle only nine, the full-2 code could handle only fifteen and the full-3 code could handle up to only twenty data drives. Also, if it were necessary to use thirty data drives, the technique of the present invention needs only six parity drives in order to allow two drive failures without data loss, whereas the full-2 code requires nine, the full-3 code requires seven and the 2d-parity code requires more than ten parity drives. It is easy to see from Table I that as a given system requires more data storage, and thus more data drives, the ECC technique of the present invention becomes more attractive relative to the other techniques.

Referring now to FIG. 1, a simplified block diagram is shown illustrating a computer system 20 coupled to a disk drive array 44 implemented using the ECC technique of the present invention. The computer system 20 is coupled to a disk controller 22 through a conventional data bus 24. The disk controller 22 could be part of the computer system 20 although it is shown here separately. The disk controller 22 is preferably coupled to the disk drive array 44 using a small computer system interface (SCSI) bus as further described below. The disk drive array 44 includes eleven data drives 50 each designated 1-11, respectively, although it is understood that the number of data drives 50 may vary depending upon the size and data storage needs of the computer system 20. From Table I, at least four parity drives 60 designated A, B, C and D, respectively, are needed for the eleven data drives 1-11.

The disk drive array 44 is preferably connected together using three separate SCSI buses 38, 40 and 42, since each SCSI bus can handle a maximum of eight devices, and each SCSI bus 28-42 includes a host bus adapter (HBA) 26, 28 and 30, as one of those devices. It is understood, however, that the ECC technique of the present invention does not depend on the specific bus system used to connect together the data drives 50 and the ECC drives 60 of the disk drive array 44. The preferred embodiment shown in FIG. 1 includes the HBA 26 and the parity drives A-D coupled to the SCSI bus 38, the HBA 28 and the data drives 1-6 coupled to the SCSI bus 40, and the HBA 30 and the data drives 7-11 coupled to the SCSI bus 42. The disk controller 22 is coupled to each of the HBAs 26-30 using data buses 32, 34 and 36, respectively. The data buses 32-36 may be separate buses or may comprise one larger bus depending upon the implementation of the disk controller 22.

The disk drive array 44 preferably includes a number of "hot spare" or replacement drives 70. A "hot spare" drive refers to a disk drive electrically coupled to the disk drive array 44 which is not normally used, but could replace any one of the data drives 50 or parity drives 60 without operator intervention. Alternatively, the replacement drives 70 could be readily available yet not connected so that any failed drive may be readily replaced by the system operator. The mean time to repair (MTTR) is the approximate mean amount of time, measured in hours, it takes to replace a failed data drive 50 or parity drive 60 with a replacement drive 70. If operator intervention is necessary, the MTTR is typically 48 hours. If hot spares are used the MTTR can be reduced, although the MTTR is still significant since an entire data drive 50 must be reconstructed. In the preferred embodiment, each of the disk drives 50, 60 and 70 in the disk drive array 44 are preferably the same size in terms of storage capacity, and preferably the same type.

The configuration of the data storage system is relatively transparent to a computer system, such as the computer system 20. The computer system 20 writes data to and reads data from the disk controller 22 through the data bus 24, wherein the disk controller 22 controls the data flow and destination to the disk drive array 44. The disk controller 22 thus preferably includes firmware which is designed to control the data flow to the disk drive array 44. Alternatively, the computer system 20 could control the data flow. For example, if only one SCSI bus is provided, the disk controller might be just a simple SCSI bus controller without the parity or ECC control logic and the computer system 20 would control the data flow to the SCSI bus and development of the parity information and other higher level control functions. The SCSI buses 38-42 and the data buses 32-36 are designed so that the controller of the data flow, which is the disk controller 22 in the preferred embodiment, may access each data drive 50, each parity drive 60, or each replacement drive 70 in the disk drive array 44 individually. In this manner, the disk controller 22 can read data from or write data to each of the data drives 50, the parity drives 60, as well as the replacement drives 70, if any.

Each time the disk controller 22 writes data to a data drive 50, the disk controller 22 also updates the corresponding associated parity drives 60 to reflect the new parity information for the new data. Associations between the data drives 50 and the parity drives 60 are described below. Also, if a data drive 50 fails, the disk controller 22 can readily determine which of the drives in the disk drive array 44 has failed.

Table II shows the combinations of the parity drives A–D to create four parity chains to implement the ECC technique for the eleven data drives 1–11. An "X" means that the data drive 50 at the top of the column is included in a parity chain where the corresponding parity bytes are stored at a corresponding location on the parity drive 60 at the left of the row.

TABLE II

| Parity Drive | ECC Configuration for Eleven Data Drives — Data Drives | | | | | | | | | | |
|---|---|---|---|---|---|---|---|---|---|---|---|
| | 1 | 2 | 3 | 4 | 5 | 6 | 7 | 8 | 9 | 10 | 11 |
| A | X | X | X | X |   | X | X | X |   |   |   |
| B | X | X | X |   | X | X |   |   | X | X |   |
| C | X | X |   | X | X |   | X |   | X |   | X |
| D | X |   | X | X |   |   |   | X |   | X | X |

It is desirable to construct the parity chains with as few data drives 50 as possible, which translates to as few X's as possible in Table II, since fewer data drives 50 need to be accessed to update the parity bytes on the corresponding parity drives 60 each time new data is written to the disk drive array 44, and each update calculation is simplified. The minimum number of data drives 50 per parity drive 60 is achieved by first associating as many data drives 50 as possible with only two parity chains by determining the maximum number of unique parity drive combinations there are taken two at a time. This maximum number is $n(n+1)/2 - n$ as determined from the equation 3 above, which equals six if n is equal to four. Then, the parity drives are taken three at a time and so on up to n at a time, until all data drives are associated with parity chains. Referring to equation 5, since there are four parity drives A–D, n is equal to four and X is equal to eleven. In Table II, for example, the parity chain associations of the data drives 6–11 are determined by the six possible combinations of the four parity drives A–D taken two at a time. The parity drives A–D are then taken three at a time, as shown in Table II for the data drives 2–5, and then four at a time until all of the data drives 50 are involved or associated with parity chains.

It should be noted that once the minimum number of parity drives is determined for the required number of data drives according to the methods presented above, and after the parity drives are taken two at a time to associate as many data drives as possible which should equal $n(n+1)/2 - n$, the parity drives could then be taken more than three at a time as long as they are taken only up to n at a time, although this may not provide the optimal solution. For example, if n equals five and there are thirteen data drives, then ten of the data drives are associated with two parity drives, and the remaining three data drives could be associated with four parity drives, taking the parity drives four at a time instead of three. Although this still conforms to the present invention, it is preferable to associate the remaining three with three parity drives to obtain an optimal solution.

The data drives 1–4 and 6–8 form a first parity chain where the parity bytes are stored on the parity drive A. The parity chain of the parity drive B includes the data drives 1–3, 5, 6, 9 and 10; the parity chain of the parity drive C includes the data drives 1, 2, 4, 5, 7, 9 and 11; the parity chain of the parity drive D includes the data drives 1, 3–5, 8, 10 and 11. Each parity byte on each parity drive 60 is calculated by the disk controller 22 by taking the EXCLUSIVE OR function of every corresponding byte on each of the data drives 50 associated with the parity chain. For example, the first byte of the parity drive A is calculated as the EXCLUSIVE OR logic function of all of the first bytes of the data drives 1–4 and 6–8. In this manner, the data of any one failed data drive 50 can be readily reconstructed from a parity drive 60 and data drives 50 associated with a particular parity chain that the failed drive is also associated with.

The disk controller 22 reconstructs the data on a failed data drive 50 on a byte-by-byte basis using one of the parity chains associated with the failed drive. Each lost byte is calculated by taking the EXCLUSIVE OR logic function of each of the corresponding bytes of the remaining data drives 50 in the parity chain and the corresponding byte of the parity drive 60, the resulting byte being equal to the lost byte. Each data drive 50 is associated with at least two parity chains. Thus, if the data drive 6 fails, the data on data drive 6 can be reconstructed onto a replacement drive 70 using the redundant data appearing on either the parity drive A and the data drives 1–4 and 7–8, or the parity drive B and the data drives 1–3, 5, 7, 9 and 10.

Table II also shows that any two drives, including the parity drives 60, could fail at any given time without data loss, since the data of one of the two failed drives can be reconstructed without the other. Suppose, for example, that the data drive 11 fails. The disk controller 22 senses that the data drive 11 has failed and then determines each parity chain that is associated with the failed data drive 11. Either parity drive C combined with the data drives 1, 2, 4, 5, 7 and 9, or the parity drive D combined with the data drives 1, 3–5, 8 and 10 could be used to reconstruct the data of failed data drive 11. Note that the data drives 1, 4 and 5 must be used in either case. The disk controller 22 then chooses one of the parity chains and one of the replacement drives 70. The lost data is reconstructed onto the chosen replacement drive 70 using the parity chain information as described above.

Suppose further that the disk controller 22 chooses the parity chain of parity drive D to replace the lost data of the data drive 11, wherein the parity chain includes the data drives 1, 3–5, 8 and 10. If the data drive 6 fails while the data drive 11 is being reconstructed, the disk controller 22 detects this failure but continues to reconstruct the data drive 11 since the data drive 6 is not necessary. While the data drive 11 is being reconstructed, the disk controller 22 also reconstructs the data drive 6 onto a second replacement drive 70, using the parity chain of the parity drive A or B. Important data is not lost since redundant data resides on exclusive parity chains.

If, instead, data drive 10 fails while the data drive 11 is being reconstructed, the disk controller 22 may not complete the reconstruction of the data drive 11 using the parity chain of the parity drive D since the data drive 10 is associated with this parity chain. However, the disk controller 22 can still reconstruct the data drive 11 by switching to the alternate parity chain of parity drive C, since the data drive 10 is not associated with that parity chain. The disk controller 22 can thus reconstruct the data drive 10 using the parity chain of the parity drive B while the data drive 11 is being reconstructed.

If, however, the data drive 5 fails while reconstructing the data drive 11, the disk controller 22 may not complete the reconstruction of the data drive 11 since the data drive 5 is associated with both of the parity chains of the parity drives C and D, and no alternate parity chains are available. The disk controller 22 thus switches to reconstruct the data drive 5 using the parity chain of the parity drive B and the data drives 1-3, 6, 9 and 10, onto a second replacement drive 70. After the data drive 5 is reconstructed, the disk controller 22 proceeds to reconstruct the data drive 11 using the parity chain of either the parity drives C or D.

Note that in any of the situations described above, important data is not lost due to the ECC technique of the present invention using redundant data on the parity drives 60.

There are situations where three data drives 50 could fail without data loss as long as three replacement drives 70 are available for substitution. For example, the data drives 1, 2 and 6 could fail at a given time, or within the MTTR, without data loss. The parity drive D and data drives 3-5, 8, 10 and 11 are first used to reconstruct the data drive 1. Then, parity drive C and the data drives 1, 4, 5, 7, 9 and 11 are used to reconstruct the data drive 2 and the data drive 6 is readily replaced using the parity chains of the parity drives A or B.

The reliability and efficiency of the ECC technique of the present invention can best be understood when compared to other techniques. The mean time to failure (MTTF) of a disk drive, $MTTF_{disk}$ or a system of drives, $MTTF_{sys}$ is an estimation of the mean time in hours before a drive or system of drives will fail. Drive utilization is determined as the number of data drives divided by the total number of drives in a disk drive array. Table III below compares the drive utilization, the $MTTF_{sys}$, and the probability of failure in one year for four different configurations using four data drives in each configuration.

TABLE III

Comparison of Four Different Fault Tolerant Systems

| Configuration | Number of Data Drives | Number of Extra Drives | Drive Utilization % | $MTTF_{sys}$ (years) | Probability of Failure in One Year % |
|---|---|---|---|---|---|
| 4 Drives | 4 | 0 | 100 | 1.14 | 58.3804 |
| 4 Drives + 1 parity | 4 | 1 | 80 | 190.59 | .5233 |
| 4 Mirroring 4 | 4 | 4 | 50 | 475.61 | .21 |
| 4 Drives + 3 parity drives (Present Invention) | 4 | 3 | 57.14 | 30,312.17 | .0033 |

The drive utilization is calculated simply by taking the number of data drives divided by the total number of drives for each configuration. The $MTTF_{disk}$ for each drive is assumed to be 40,000 hours, or approximately 4.566 years. Thus, the $MTTF_{sys}$ for drive systems using 4 data drives and 1 parity drive or 4 mirroring 4 drives is calculated using equation 6:

$$MTTF_{sys} = \frac{MTTF_{disk}}{nG\left(1 - e^{-\frac{MTTR(n-1)}{MTTF_{disk}}}\right)} \quad (6)$$

where G is the number of groups and n is the number of disk drives per group. An MTTR value of 48 hours for each drive is utilized for the calculations. Note further that $MTTF_{sys}$ is first calculated in hours and then converted to years. For 4 data drives and 1 parity drive, G is equal to 1 and n is equal to 5. For 4 mirroring 4, G is equal to 4 and n is equal to 2.

The $MTTF_{sys}$ for the ECC technique of the present invention using 4 drives and 3 parity drives is calculated using equation 7:

$$MTTF_{sys} = \frac{MTTF_{disk}}{nG\left(1 - e^{-\frac{MTTR(n-1)}{MTTF_{disk}}} - (n-1)e^{-\frac{MTTR(n-2)}{MTTF_{disk}}}\left(1 - e^{-\frac{MTTR}{MTTF_{disk}}}\right)\right)} \quad (7)$$

where G is equal to one, and n is equal to seven.

The probability of failure in one year for each configuration in Table III is calculated using equation 8:

$$P(t) = 1 - e^{-\frac{t}{MTTF_{sys}}} \quad (8)$$

where t equals one year and the $MTTF_{sys}$ from Table III for each configuration is substituted into equation 8.

The first configuration is four stand-alone data drives with no error correction. Although drive utilization is the highest possible, this configuration has a high probability of a failure in one year. Also, any drive failure in the first configuration results in data loss, which is very undesirable. 4 data drives plus 1 parity drive has high utilization and moderate $MTTF_{sys}$. Although the probability of failure appears to be low, it is considered marginal if any data loss is deemed unacceptable. Further, a second data drive failure in the second configuration results in data loss.

4 mirroring 4 drives has low drive utilization yet a much improved $MTTF_{sys}$. The probability of failure is still marginal, however, and only one drive in each group could fail without data loss. Note also that the drive utilization does not change regardless of the number of data drives, so that drive utilization is always low, making mirrored drive systems less attractive, although many systems use this technique at the present time.

The ECC technique of the present invention for four drives has relatively low drive utilization. Note from Table I, however, that the drive utilization quickly becomes very favorable as the number of data drives increases. For example, a data storage system using 11 data drives needs only 4 parity drives, resulting in 73% utilization. The values for $MTTF_{sys}$ and probability of failure in one year are substantially improved over any of the other techniques using four data drives. A system using 11 data drives and 4 parity drives has an $MTTF_{sys}$ of approximately 2,348 years, which is more reliable than the prior techniques shown in Table III using four parity drives. The reliability is also believed to be greater than that of 2-d parity and full-2 systems using an equal number of data drives.

Indeed, the ECC technique of the present invention also is more reliable than mirroring, which has a lower drive utilization. 4 data drives with 3 parity drives configured using the technique of the present invention is more than sixty times less likely to fail, and thus more reliable, than 4 mirroring 4 drives. This is due to the fact that any second drive may fail during the relatively short MTTR after a first drive fails without data loss. The probability of losing data is thus substantially reduced using the technique of the present invention over the other techniques illustrated, without further sacrificing drive utilization.

Performance of the ECC technique of the present invention can be improved even further if the data and parity information is staggered, or distributed throughout all the disk drives rather than having the data and parity information reside on separate disk drives. The distribution of the data and parity information, referred to as striping, allows partial stripe writes to occur simultaneously. Each disk drive includes one or more circular magnetic disks and each magnetic disk is divided into a plurality of storage channels or tracks, which are concentric circles on the circular magnetic disks. Each track is further divided into a fixed number of sectors, which is usually the smallest unit of storage read or written by a disk drive. Many units of division of the magnetic disks could be used to distribute the data and parity information to improve the performance of the present invention, such as tracks or single or multiple sectors. The divisions will be referred to as stripes and the size of the stripes may vary depending upon the particular computer system. It is only required that each stripe be the same size in a given disk array.

Table IV illustrates the parity chains for the ECC technique using the three parity drives A-C and the four data drives 1-4.

TABLE IV

| ECC Configuration for Four Data Drives | | | | |
|---|---|---|---|---|
| Parity Drive | Data Drives | | | |
| | 1 | 2 | 3 | 4 |
| A | X | X | X | |
| B | X | X | | X |
| C | X | | X | X |

Referring to Table IV, it can be seen that a write to a first sector on the data drive 2 and a write to a different sector on the data drive 4 must be done consecutively since both writes involve the same parity drive B. This is because a single disk drive, such as the parity drive B, can only write to one sector at a time. As can be seen from Table I, as the number of data disk drives increases compared to the number of parity disk drives, a bottleneck effect occurs since multiple writes to separate data drives will statistically involve a high percentage of common parity drives, forcing many writes to occur consecutively. It is noted that although the present invention is focused on reducing the number of parity drives at the cost of increased update penalty and bottlenecking, some of this penalty can be alleviated by striping.

Figure 2:
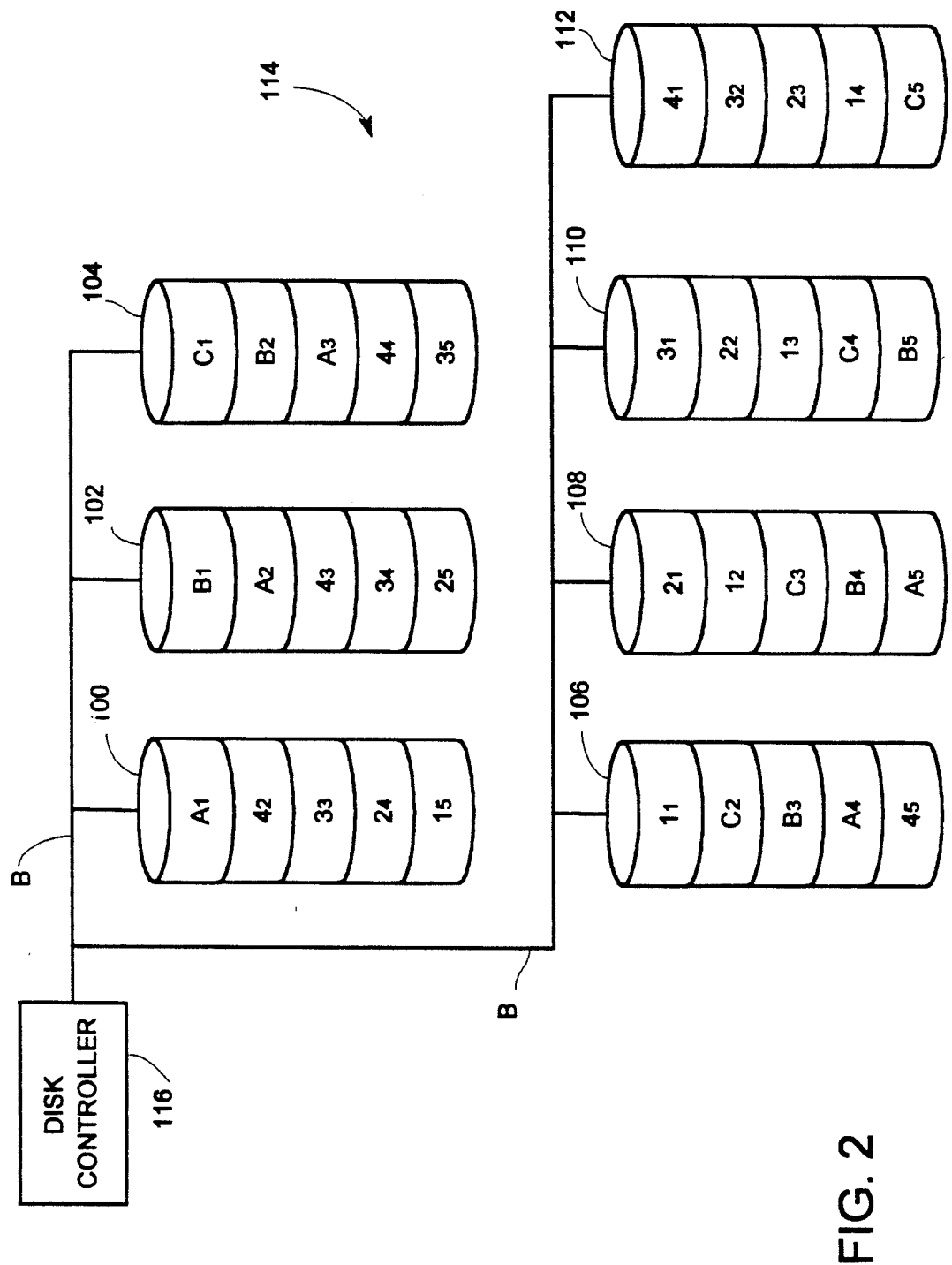
FIG. 2 is a simplified block diagram illustrating a striped disk array implemented with the ECC technique of the present invention.

Referring now to FIG. 2, a simplified block diagram is shown illustrating a disk array 114 using the ECC technique of the present invention with the data and parity information of the four logical data drives 1-4 and the three logical parity drives A-C distributed among seven physical disk drives 100-112. The disk drives 100-112 are shown connected to a data bus generally referred to by the letter B, which is further connected to a disk controller 116. The specific implementations of the bus B and the disk controller 116 are ignored since the present invention is not limited to any particular bus scheme. References are made to logical parity drives A-C and logical data drives 1-4 to maintain consistency with the previous example so that the parity chain associations are maintained and more easily referenced.

Each of the disk drives 100-112 are divided into equal consecutive memory segments, or memory stripes, each stripe including at least one sector. For simplicity, only the first five stripes will be referenced, although in practice the number of stripes per disk could be greater than five. The data of the parity drives A-C and the data drives 1-4 is also divided into the same number of consecutive stripes, each parity stripe and each data stripe being the same size in sectors as the memory stripes. Thus, when the logical parity drives A-C and the logical data drives 1-4 are mapped onto the physical disk drives 100-112, each memory stripe can contain either a data or a parity stripe. The first five data and parity stripes are each designated with a subscript from 1-5, respectively, so that the data of the data drives 1-4 and the parity of parity drives A-C are divided into sets of data stripes $1_1$-$1_5$, $2_1$-$2_5$, $3_1$-$3_5$, $4_1$-$4_5$ and $A_1$-$A_5$, $B_1$-$B_5$, and $C_1$-$C_5$, respectively. It is important to note that the parity chains of Table IV still apply, except that each parity chain is divided into a set of stripes such that each parity stripe contains the parity information for a corresponding chain of data stripes. For example, the parity stripe $A_1$ contains the parity for the data stripes $1_1$, $2_1$ and $3_1$. Thus, the set of parity stripes $A_1$-$A_5$ forms a set of parity chains for the sets of data stripes $1_1$-$1_5$, $2_1$-$2_5$ and $3_1$-$3_5$, respectively. Also, the set of parity stripes $B_1$-$B_5$ forms a set of parity chains for the sets of data stripes $1_1$-$1_5$, $2_1$-$2_5$ and $4_1$-$4_5$, and the set of parity stripes $C_1$-$C_5$ forms a set of parity chains for the sets of data stripes $1_1$-$1_5$, $3_1$-$3_5$ and $4_1$-$4_5$, respectively.

Finally, all of the parity stripes are preferably distributed into corresponding memory stripes of the disk drives 100-112, so that each of the disk drives 100-112 contains both parity and data information. In the preferred embodiment, the set of parity stripes $A_1$-$A_5$ is distributed into the five disk drives 100-108 so that the parity stripe $A_1$ is in the first memory stripe of the disk drive 100, the parity stripe $A_2$ is in the second memory stripe of the disk drive 102, the parity stripe $A_3$ is in the third memory stripe of the disk drive 104, the parity stripe $A_4$ is in the fourth memory stripe of the disk drive 106, and the parity stripe $A_5$ is in the fifth memory stripe of the disk drive 108. In a like manner, the set of parity stripes $B_1$-$B_5$ is preferably distributed into corresponding memory stripes of the disk drives 102-110, the set of parity stripes $C_1$-$C_5$ is distributed into the disk drives 104-112, and the sets of data strips $1_1$-$1_5$, $2_1$-$2_5$, $3_1$-$3_5$ and $4_1$-$4_5$ are distributed into corresponding memory stripes of the disk drives 106-112 and 100, 108-112 and 100-102, 110-112 and 100-104, and 112 and 100-106, respectively, as shown in FIG. 2.

It should be noted that the specific striping scheme just described is not the only scheme that could be used. In fact, the data stripes and parity stripes could be distributed on the disk drives 100-112 in many different ways to implement striping. It is only required that in any striping distribution scheme, the parity chains of Table IV be followed and that the disk controller 116, or a computer system connected thereto, maintain the proper parity chains as described previously.

Recall that when the data and parity are not distributed, as shown in Table IV, a write to any sector on the data drive 2 and to another sector on the data drive 4 must be done consecutively since the parity drive B must be updated in both cases. In FIG. 2, a write to the data stripe $2_1$ on the first stripe of the disk drive 108 also involves an update write to the parity stripes $A_1$ and $B_1$ in the first stripes of the disk drives 100 and 102, respectively. A write to the data stripe $4_5$ in the fifth stripe of the disk drive 106 also involves an update of the parity stripes $B_5$ and $C_5$ in the fifth stripes of the disk drives 110 and 112, respectively. In this manner, a write to the data stripe $2_1$, involves the disk drives 108, 100 and 102, while a write to the data stripe $4_5$ involves the disk drives 106, 110, and 112, or three completely different disk drives. Thus, the writes to the data stripes $2_1$ and $4_5$ can occur simultaneously since different disk drives are used in either case. This is due to the fact that the parity stripes $B_1$ and $B_5$ are no longer on the same disk drive.

It is true that data distribution or striping as described above will not solve all data clashes so that many writes must occur consecutively rather than simultaneously. For example, a write to the data stripes $1_1$, and $4_2$ will both involve the disk drive 100, and thus must be executed consecutively. Nonetheless, data striping can improve the performance of a data storage system by reducing the number of data clashes.

Reconstruction of a failed disk drive in a striped or distributed disk array is similar to reconstruction of data of a non-striped disk array as described above, except that it is more complicated and must be performed on a stripe-by-stripe basis. The ECC technique of the present invention still applies since even if any two of the disk drives 100-112 fail, the remaining disk drives contain the redundant information through the parity chains such that both failed drives can be reconstructed without data loss. The disk controller, however, must perform reconstruction on a slightly more complicated level.

For example, if the disk drive 100 fails, the disk controller 116 must reconstruct the data stripes $4_2$, $3_3$, $2_4$ and $1_5$ as well as the parity stripe $A_1$, using one of the corresponding parity chains associated with that data or parity stripe. Note that to reconstruct the data stripe $2_4$, the parity stripe $A_4$ and the data stripes $1_4$ and $3_4$ could be used involving the disk drives 106, 112 and 102, respectively. Alternatively, the data stripe $2_4$ could be reconstructed using the parity stripe $B_4$ and the data stripes $1_4$ and $4_4$, involving the disk drives 108, 112 and 104, respectively. In either case, the data stripe $1_4$ on the disk drive 112 is necessary. If the disk drive 112 fails while the disk drive 100 is being reconstructed, the data stripe $1_4$ of the disk drive 112 must be reconstructed first before the data stripe $2_4$ can be reconstructed. This is easily done by the disk controller 116 using the parity stripe $C_4$ and the data stripes $3_4$ and $4_4$ of the disk drives 110, 102 and 104, respectively. Therefore, any two disk drives in a striped disk array, such as the disk array 114, can fail without data loss and the reconstruction is performed on a stripe-by-stripe basis rather than on a disk-by-disk basis.

In summary, the ECC technique of the present invention is implemented using n parity drives to create n parity chains for up to $2^n - n - 1$ data drives in a disk array having up to $2n - 1$ disk drives, where each data drive is associated with the parity chains of a combination of at least two parity drives, no two parity drive combinations being the same. Also, the n parity drives are taken two at a time, then more than two at a time up to n at a time, until each of the data drives are associated with a corresponding combination of parity drives. Preferably, the drives are taken two at a time, then three at a time, and so on up to n at a time. For practical purposes, n should be greater than two, and the number of data drives should be at least $n(n+1)/2 - n + 1$ for n parity drives for a total of $n(n+1)/2 + 1$ disk drives, since otherwise the full-2 code might be implemented.

The disk array is coupled to a bus system including a disk controller, and the disk controller includes firmware to keep track of the parity chains and to update the parity when the data changes. The disk controller selects an associated parity chain to reconstruct the data of a failed data drive onto spare or replacement disk drives. The disk controller also selects alternate parity chains, if necessary, to reconstruct the data of two drives in the event of a second drive failure. Finally, the data and parity information may be striped, or distributed throughout the disk array to improve the performance of the present ECC technique.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A data storage system, comprising:
   a disk controller; and
   a number of disk drives coupled to said disk controller, said number being between $(n(n+1)/2)+1$ and $2n-1$, inclusive, n being a positive integer greater than 2,
   wherein n of said disk drives are parity drives and the remaining of said disk drives are data drives, each said parity drive being associated with a parity chain including a subset of less than all of said data drives wherein each byte of each said parity drive is a parity byte for corresponding bytes of said subset of data drives associated with said parity drive, and
   wherein said parity chain associations between said parity drives and said data drives are determined by first taking said parity drives two at a time, then taking said parity drives more than two at a time until all of said data drives are associated with at least two of said parity chains and none of said parity chains are the same.

2. The data storage system of claim 1, wherein said parity drives are first taken two at a time, then three at a time and so on up to n at a time.

3. The data storage system of claim 1, wherein when said disk controller writes a data byte to one of said data drives, said disk controller updates a corresponding parity byte on each said parity drive associated with each said parity chain with which said one data drive is associated.

4. The data storage system of claim 1, wherein said disk controller includes:
   means for determining which one of said data drives failed in the event a first data drive fails; and
   means for selecting one of said parity chains with which said first failed data drive is associated and for recalculating each data byte of said failed drive using corresponding bytes of said parity drive and each remaining data drive associated with said one of said parity chains.

5. The data storage system of claim 4, wherein said disk controller further includes:

means for determining which additional one of said data drives failed in the event a second data drive fails;

means for selecting a parity chain associated with said second failed data drive that is not associated with said first failed data drive; and means for recalculating each data byte of said second failed data drive using corresponding bytes of said parity drive and each remaining data drive associated with said selected parity chain associated with said second failed data drive.

6. The data storage system of claim 4, further comprising:

a replacement drive coupled to said disk controller; and said disk controller further including means for writing said recalculated data bytes onto said replacement drive.

7. A data storage system, comprising:

a disk controller; and a number of disk drives coupled to said disk controller, said number being between $(n(n+1)/2)+1$ and $2n-1$, inclusive, n being a positive integer greater than 2, each said disk drive being divided into a set of a predetermined number of consecutive stripes of memory, each said memory stripe being a predetermined size, wherein said memory stripes of said disk drives contain n sets of parity stripes and said number of disk drives minus n sets of data stripes, each said parity stripe set comprising a number of parity stripes equal to said predetermined number each being said predetermined size, each said data stripe set comprising a number of data stripes equal to said predetermined number each being said predetermined size, each said memory stripe containing one of said data stripes or one of said parity stripes, and each said parity stripe set being associated with a parity chain including a subset of less than all of said data stripe sets wherein each byte of each said parity stripe is a parity byte for corresponding bytes of corresponding data stripes of said subset of data stripe sets associated with said parity stripe set, wherein said parity chain associations between said parity stripe sets and said data stripe sets are determined by first taking said parity stripe sets two at a time, then taking said parity stripe sets more than two at a time until all of said data stripe sets are associated with at least two of said parity chains and none of said parity chain associations are the same, and wherein said parity and data stripes are distributed into said memory stripes of said disk drives.

8. The data storage system of claim 7, wherein said parity and data stripe distributions are such that the first data stripe of each said data stripe set and the first parity stripe of each said stripe set is located in the first memory stripe of a corresponding disk drive, and every next parity stripe of each said parity stripe set and every next data stripe of each said data stripe set is located in a corresponding memory stripe of a corresponding disk drive.

9. The data storage system of claim 7, wherein said parity stripe sets are first taken two at a time, then three at a time and so on up to n at a time.

10. The data storage system of claim 7, wherein when said disk controller writes data to one of said data stripes, said disk controller updates all of said corresponding parity stripes associated with each said parity chain of which said one data stripe is associated with.

11. The data storage system of claim 7, wherein said disk controller includes:

means for determining which one of said data drives failed in the event a first data drive fails; and means for selecting one of said parity chains for each one of said data stripes and parity stripes of said failed drive wherein each said selected parity chain is associated with a corresponding one of said parity and data stripes of said failed drive and for recalculating each said data stripe and parity stripe of said failed drive using corresponding parity stripes and data stripes of said selected parity chain.

12. The data storage system of claim 11, wherein said disk controller further includes:

means for determining which additional one of said data drives failed in the event a second data drive fails;

means for selecting a parity chain for each one of said data stripes and parity stripes of said second failed drive wherein each said selected parity chain for said second failed drive is associated with a corresponding one of said parity and data stripes associated with said second failed data drive but that is not associated with said first failed data drive; and means for recalculating each data byte of said second failed data drive using corresponding bytes of said parity drive and each remaining data drive associated with a corresponding one of said selected parity chains associated with said second failed data drive.

13. The data storage system of claim 11, further comprising:

a replacement drive coupled to said disk controller; and said disk controller further including means for writing said recalculated data bytes onto said replacement drive.

* * * * *

UNITED STATES PATENT AND TRADEMARK OFFICE
CERTIFICATE OF CORRECTION

PATENT NO. : 5,331,646
DATED : Jul. 19, 1994
INVENTOR(S) : MARK S. KRUEGER and E. DAVID NEUFELD

It is certified that error appears in the above-identified patent and that said Letters Patent is hereby corrected as shown below:

In column 16, line 33, please delete "2n" and insert in its place --$2^n$--.

In column 17, line 26, please delete "2n" and insert in its place --$2^n$--.

Signed and Sealed this

Eighth Day of October, 1996

Attest:

BRUCE LEHMAN

*Attesting Officer*     Commissioner of Patents and Trademarks